Sept. 4, 1951 J. E. ALBRIGHT 2,566,509

TELEVISION CAMERA WITH INDICATOR

Filed Dec. 19, 1946

INVENTOR
James E. Albright
BY
ATTORNEY

Patented Sept. 4, 1951 2,566,509

UNITED STATES PATENT OFFICE 2,566,509

TELEVISION CAMERA WITH INDICATOR

James E. Albright, Collingswood, N. J., assignor to Radio Corporation of America, a corporation of Delaware Application December 19, 1946, Serial No. 717,163

1 Claim. (Cl. 178—6.8)

This invention relates to television systems and more particularly to the transmission of indicator readings in conjunction with the principal television image.

It often becomes desirable for many television system applications to have, in addition to the principal image transmission, a remote indication of one or more indicating devices.

There are fundamentally two systems which may be employed for the transmission of such information. The first fundamental system is an electrical system. In the electrical system, the reading of the indicating device is transformed into an electrical signal which may be added to the video signal. The reading may be converted directly into a signal, or the signal may be provided by spiral scanning the face of the indicating device and deriving a signal from the scanning operation. Such an electrical system for transmitting indicator readings is shown and described in the U. S. Patent No. 2,535,547 to Waldemar J. Poch granted December 26, 1950.

The second fundamental system is an optical one. In the optical system, the face of the indicating device or meter can be optically reproduced in a manner similar to that employed in the transmission and reproduction of the principal image.

A portion of the image area may be specifically allotted to the optical reproduction of the indicating device.

According to this invention, an auxiliary lens focuses an indicator dial on a portion of the image electrode of a television camera tube, and the dial of the indicating device is reproduced in connection with the principal image at the remote location.

A primary object of this invention is to provide improved equipment for transmitting indicator readings in connection with the principal image in a television system.

Another object of this invention is to provide an improved telemetering system.

Other and incidental objects of the invention will be apparent to those skilled in the art from a reading of the following specification and an inspection of the accompanying drawing in which.

Figures 1, 2, 3:
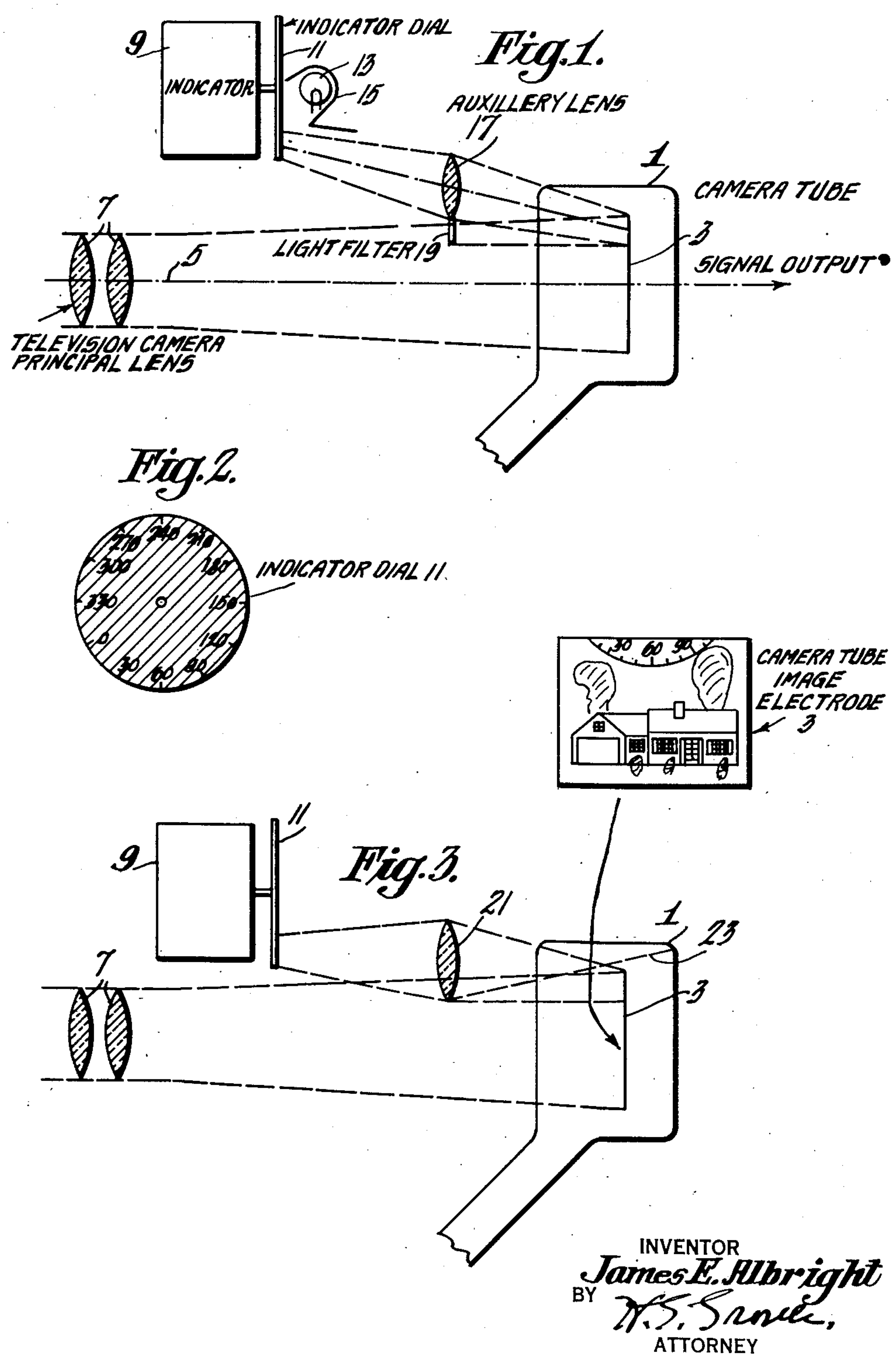
Figure 1 illustrates schematically a preferred form of this invention.
Figure 2 illustrates schematically in detail a typical indicator dial and the composite image focused on the camera tube image electrode, in accordance with a preferred form of this invention.
Figure 3 illustrates schematically this invention in another of its preferred forms.

Turning now in detail to Figure 1, a camera tube 1 containing an image receiving electrode or mosaic target 3 is positioned on an optical axis 5 of the associated television camera principal lens 7.

The camera tube 1 is illustrated as an iconoscope, but may be of any of the well-known types such as the orthicon or the image orthicon. The iconoscope is well described in detail in an article entitled "Theory and performance of the iconoscope" by V. K. Zworykin, G. A. Martin, and L. E. Flory, beginning on page 1071 in the "Proceedings of the Institute of Radio Engineers" for August, 1937. A television camera of the image orthicon type is shown and described by R. D. Kell and G. C. Sziklai in "RCA Review" for March, 1946. Further reference to a tube of this variety may be found in an article by A. Rose and H. Iams in "Proceedings of the Institute of Radio Engineers" for September, 1939, which article is entitled "Television pickup tubes using low velocity electron beam scanning" on pages 547–555.

The principal lens 7 may also take any of the well-known forms of television camera lenses, its size and formula being governed by the desired application such as described in an article entitled "Form factors affecting the choice of lenses for television cameras" by H. B. DeVore and Harley Iams, beginning on page 369 of the "Proceedings of the Institute of Radio Engineers" for August, 1940.

Indicator 9, which may take the form of a compass or other indicating device, contains an indicator dial 11. Indicator dial 11 is preferably a black dial having white markers and white marker identifications.

A lamp 13 is positioned adjacent dial 11 to provide illumination therefor. As illustrated, a light shield 15 serves both as a reflector for lamp 13 and as a mask element to mask all but a predetermined portion of dial 11.

An auxiliary lens 17 is positioned between the indicator dial 11 and the image electrode 3 such that an image of a predetermined portion of indicator dial 11 is focused on a predetermined portion of image electrode 3.

It will be seen that the principal image area on image electrode 3 will overlap the area of the image of indicator dial 11. This, in some instances, may make it difficult to read the indicator dial markings on the image electrode 3. According to this invention in one of its preferred forms, a light restricting means, which may take the form of a light filter 19, is positioned between the principal lens 7 and a portion of the image electrode 3. The position of the light filter 19 is adjusted such that the light from the principal lens 7 will be reduced over that portion of the image electrode 3 upon which the image of the dial 11 is focused.

Turning now to Figure 2, there is shown in detail a typical indicator dial 1 and a camera tube image electrode 3. There is illustrated on mosaic or image electrode 3 in Figure 2 a picture of a scene including a house and trees. There is also illustrated an image of a portion of indicator dial 11 on the upper edge. It will be seen, however, that the image of the portion of the indicator dial 11 overlaps a portion of the trees shown in the principal image. The size of the portion of the image of the indicator dial 11 must be at least large enough that a complete dial marker identification is in view regardless of the indication of the indicator dial.

Turning now in detail to Figure 3, there is shown an indicator 9 and its associated dial 11, together with the camera tube 1 and image electrode 3. Similar elements to those shown in Figure 1 are indicated by like numerals. A principal lens 7 focuses a principal image on image electrode 3.

An auxiliary lens 21 is positioned to focus an image of a portion of dial 11 on a portion of image electrode 3, and in addition, auxiliary lens 21 is so positioned that it intercepts a portion of the light from principal lens 7 to that portion of image electrode 3 containing the image of dial 11. The size of the auxiliary lens 21, its focal length and its relative position are not only controlled by the relative position of the dial 11 and the image electrode 3, but also its characteristics are chosen such that the intercepted light from lens 7 is all refracted above the image electrode 3 so that no dispersed light from lens 7 will fall on the upper portion of image electrode 3. For example, the lowest ray of light passing through both lenses 7 and 21 takes the position of ray 23. In this form of the invention, the auxiliary lens 21 serves two purposes. One purpose is to focus an image of a portion of indicator dial 11 on a portion of image electrode 3 and also to act as a light restricting element to reduce the intensity of the principal image on the image electrode 3 over that portion of image electrode 3 upon which the image of dial 11 is focused.

The size of the auxiliary lens 21 may also be chosen such that the area occupied by the image of indicator dial 11 on the image electrode 3 will be the same in size and shape as the shadow cast on the image electrode 3 by the auxiliary lens 21.

Having thus described my invention, what is claimed is:

In a television system including a camera tube having an image electrode and a principal lens associated with said camera tube, an indicator dial, an auxiliary lens, said auxiliary lens positioned between said image electrode and said indicator dial to project an image of a portion of said dial on a predetermined portion of said image electrode, and a light restricting element, said light restricting element positioned in the light path substantially only between said principal lens associated with said camera tube and said predetermined portion of said image electrode.

JAMES E. ALBRIGHT.

REFERENCES CITED

The following references are of record in the file of this patent:

UNITED STATES PATENTS

| Number | Name | Date |
|---|---|---|
| 1,228,722 | Verbeck | June 5, 1917 |
| 2,073,370 | Goldsmith | Mar. 9, 1937 |
| 2,099,980 | Iams | Nov. 23, 1937 |
| 2,144,500 | Nicholson | Apr. 19, 1938 |
| 2,250,442 | Abbell | July 29, 1941 |
| 2,262,942 | Jones | Nov. 18, 1941 |
| 2,299,083 | Elm | Oct. 20, 1942 |
| 2,417,446 | Reynolds | Mar. 18, 1947 |